United States Patent [19]

Su et al.

[11] Patent Number: 5,352,245
[45] Date of Patent: Oct. 4, 1994

[54] PROCESS FOR TINTING CONTACT LENS

[75] Inventors: Kai C. Su; William M. Hung, both of Alpharetta, Ga.

[73] Assignee: Ciba-Geigy Corporation, Ardsley, N.Y.

[21] Appl. No.: 984,188

[22] Filed: Nov. 20, 1992

[51] Int. Cl.$^5$ ............................................. D06P 5/00
[52] U.S. Cl. ........................................ 8/507; 351/162
[58] Field of Search ............................ 8/507; 351/162

[56] References Cited

U.S. PATENT DOCUMENTS

| | | | |
|---|---|---|---|
| 4,310,330 | 1/1982 | Funaki et al. | 8/506 |
| 4,468,229 | 8/1984 | Su | 8/507 |
| 4,553,775 | 11/1985 | Halling | 285/55 |
| 4,553,975 | 11/1985 | Su | 8/507 |
| 4,559,059 | 12/1985 | Su | 8/507 |
| 4,704,017 | 11/1987 | Knapp | 351/177 |
| 4,719,657 | 1/1988 | Bawa | 8/453 |
| 4,872,405 | 10/1989 | Sterman | 101/44 |
| 4,891,046 | 1/1990 | Wittmann et al. | 8/507 |
| 4,954,132 | 9/1990 | Hung | 8/507 |
| 4,981,487 | 1/1991 | da Costa | 8/507 |

FOREIGN PATENT DOCUMENTS 388358 9/1990 European Pat. Off. .
WO9220005 11/1992 World Int. Prop. O. ..... G02C 7/04

OTHER PUBLICATIONS

Abstract Japan 01,188,824, Menion, KK.
Abstract Japan 3264–719A, Tokyo Contact Lens.
Database WPI, Week 9245, Derwent Publications Ltd. London, GB; AN 92–369430 & JPA–04270312 (Seiko Epson) Sep. 25, 1992 Abstract.

Primary Examiner—Paul Lieberman
Assistant Examiner—Margaret Einsmann
Attorney, Agent, or Firm—Edward McC. Roberts; R. Scott Meece

[57] ABSTRACT

A contact lens colorant formulation containing a surfactant is applied to a dry hydrophilic contact lens by means of a silicon rubber printing pad to provide a cosmetically acceptable, solid, unblemished covering. This process allows for a solid covering to be placed onto the lens in a single printing step using standard transfer printing devices.

18 Claims, No Drawings

PROCESS FOR TINTING CONTACT LENS

BACKGROUND OF THE INVENTION

The present invention relates to an improvement in a process for preparing a tinted contact lens. In particular, the invention relates to a process for proving a solid, unblemished layer of coloring agent onto the surface of an unhydrated hydrophillic contact lens.

There are many known methods for tinting or otherwise coloring contact lenses. For example, a coloring agent, such as a dyestuff or pigment, may be dispersed in a monomer precursor or polymer matrix. This method is typically unsuitable for use in hydrophilic contact lenses, however, because the coloring agent leaches from the polymer upon the presence of water in the lens. Also, this method does not provide the ability to color the polymer once it has been made into a lens.

Another known method of coloring lenses is printing or otherwise applying the coloring agent to the lens surface. This method has been performed using standard transfer print devices, such as a TAMPO RAPID 2000/3 pad printing machine from Transtech America Inc., Chicago, Ill. Typically, the printing method employs solvent-based coloring agent applied to the lens with a silicone rubber pad. This method is also problematic in that it does not provide an unblemished, solid covering of colorant on the dry lens surface. One attempt at solving this problem has been known to create a solid pattern from a plurality of overlying halftone dots using multiple transfer printing steps. This process is not totally satisfactory, however, in that the resulting colorant cover is blemished or mottled. Another proposed solution to the problem associated with transfer printing of colorant to a hydrophilic surface has been to abandon using solid colorant coverings altogether, and replacing it with known halftone patterns on dry lens having spaces. However, surface tinting remains the preferred method of applying color to contact lenses.

There exists a need, therefore, for a process of providing a solid, unblemished colorant onto an unhydrated contact lens made of hydrophilic material.

There exists a further need for such a method as described above which utilizes standard transfer printing technology, particularly that involving "off-the-shelf" silicon rubber printing pads.

There exists a still further need for such a process which incorporates a single printing step.

SUMMARY OF THE INVENTION

According to the present invention, a colorant formulation containing a non-ionic polyalkylene oxide surfactant is applied to a dry hydrophilic contact lens by means of a silicon rubber printing pad to provide a cosmetically acceptable, solid, unblemished covering. This process allows for a solid covering to be placed onto the lens in a single printing step using standard transfer printing devices. The lens may then be used for changing eye color of the wearer, or it may be lightly tinted so as to enhance visibility of the lens when off the eye without changing the eye color when worn. The colorant covering may be used for other purposes as well.

DETAILED DESCRIPTION OF THE INVENTION

According to the present invention, a process for providing a colored contact lens using a silicon rubber printing pad, or "tampon," may be improved by the use of a specific colorant formulation.

The colorant formulation of the present invention includes a non-ionic polyalkylene oxide surfactant in the colorant. Of particular interest are low molecular weight ethylene oxide polymers. An example of such a surfactant is commercially available under the trade name "SILWET" from Union Carbide Corporation. SILWET surfactants are a series of polyalkylene oxide-modified methylpolysiloxanes composed of a siloxane molecular backbone with organic polyalkylene oxide pendants. Among the SILWET products, type L-77 has been found to be particularly well suited for the present invention. SILWET L-77 is a nonionic polyalkyleneoxide methoxy-terminated polydimethylsiloxane having the following physical properties: average molecular weight of about 600 Daltons, boiling point of greater than 150° C. at 1 atm pressure, freezing point of about 1.1° C., and specific gravity of about 1.007 at 25° C. Another example of commercially available surfactants which can be used in accordance with the present invention is available from Air Products and Chemicals, Inc., Allentown, Pa., under the tradename "Surfynol." Surfynol type 104 PA, which is 50% 2,4,7,9-tetramethyl-5-decyn-4,7-diol in isopropyl alcohol, and Surfynol type 420, which is an ethylene oxide adduct of 2,4,7,9-tetramethyl-5-decyn-4,7-diol (having 20% by weight ethylene oxide) have been found to be particularly well suited for use in the present invention. Generally, the colorant formulation comprises about 0.01 to 2.0% of the non-ionic polyalkylene oxide surfactant. These surfactants may be used alone or in combination, preferably in a 1:1 ratio by weight, as illustrated in the examples below.

In general, the formulations useful in the present invention may include any type of coloring agent, typically an ink. However, it has been found that the present invention provides exceptionally good results when the colorant used in the formulation contains a reactive dye, such as those commonly referred to as "reactive dyes forming ether linkages." These dyes contain reactive groups which react with cellulose to form an ether linkage, and are generally described in *Fiber-Reactive Dyes*, Chapter VI, by W. F. Beech, SAF International, Inc. New York (1970), as well as in U.S. Pat. Nos. 4,468,229; 4,553,775: 4,553,975; 4,559,059 and 4,954,132; all to Su, and all incorporated herein by reference. The dye may also be a clear ultraviolet light blocking agent. The dye is preferably present in the colorant formulation at about 0.5 to 15.0% by weight of the total mixture.

Generally, the colorant formulation may also comprise about 5.0 to 30.0% by weight polyvinylpyrolidone and 10 to 40% isopropyl alcohol. The remainder of the colorant formulation is preferably deionized water.

The lens may be comprised of any hydrophilic material, so long as at least one of the monomeric components which form the material contains an exoskeletal functional group which can react with the dyestuff molecule. Examples of such functional groups commonly present in contact lens materials are the hydroxyl, amino, amide and thio groups, and functional derivatives thereof. Particularly suitable monomers for this purpose are hydroxyalkyl esters of polymerizable unsaturated acids, such as acrylic, methacrylic, itaconic, fumaric and maleic acids. Among such esters, hydroxyethyl methacrylate (HEMA) has been used quite extensively.

The following examples will illustrate the present invention. These examples should be viewed as illustrative, without in any way limiting the scope of the instant invention.

EXAMPLE I

A TAMPO RAPID 2000/3 pad printing machine having a yellow silicon printing pad, a turntable for manuevering a plurality of lens into a desired printing area beneath the pad, and a cliche with 9,274 mm diameter and 0,020mm depth, solid pattern design, all available from Transtech America, Inc. was used in the process.

An colorant formulation was prepared, comprising:
1) 15.5 g of PVP K-30 30% aqueous solution;
2) 3.7 g of 2-Propanol;
3) 0.10 g of Silwet L-77; and
4) 0.70 g of Ramazol Black B dye (from American Huechst Corp.).

Approximately 10 ml of the colorant formulation was placed into the inkcup of the machine. The cliche was placed on the top of and tied to the inkcup using a transferable clamp. The inkcup/cliche assembly was clamped to the cliche holder of the machine, and dry HEMA contact lenses were placed onto the turntable. The machine was activated, and the top surface of each lens was printed with the formulation in a single step. The lenses were then left to dry for 10 minutes at room temperature (about 23° C.). The lenses were then placed, printed side up, into an aqueous fixing solution comprising 10% sodium phosphate tribasic dodecahydrate and 10% tetrabutylammonium bromide at 60° C. for 30 minutes. The lenses were then rinsed with saline and extracted for a period of ten minutes at 80° C. in a solution of 10% glocyrol solution, then for a period of ten minutes at 80° C. in a fresh solution of 10% glocyrol solution, then for a period of ten minutes at 80° C. in deionized water, and finally for a period of one hour at 80° C. in phosphate buffered saline.

The finished lens had an unblemished coating of blueish-black colorant. This darkened type of lens may be used as a prosthetic lens by itself, or may be printed with a subsequent artificial iris pattern to provide a cosmetic, opaque lens.

EXAMPLE II

The procedures of Example I were repeated, except the lenses were placed in the fixing solution at 23° C. for three hours and the colorant formulation was as follows:
1) 8.0 g of PVP K-30 30% aqueous solution,
2) 5.0 g of 2-Propanol,
3) 4.0 g of deionized water,
4) 0.035 g of Surfynol 420,
5) 0.035 g of Surfynol 104 PA and
6) 2.00 g of Ramazol Brilliant Blue R dye (from American Huechst Corp.).

The finished lens had an unblemished cover of blue colorant and color intensity sufficient for a tinted contact lens. The lens showed excellent use as a lens for turning light colored eyes, such as green, to blue.

EXAMPLE III

The procedures of Example I were repeated, except the lenses were placed in the fixing solution at 23° C. for one hour and the colorant formulation was as follows:
1) 8.0 g of PVP K-30 30% aqueous solution,
2) 5.0 g of 2-Propanol,
3) 4.0 g of deionized water,
4) 0.035 g of Surfynol 420,
5) 0.035 g of Surfynol 104 PA and
6) 1.50 g of Ramazol Turquoise R-P dye (from American Huechst Corp.).

The finished lens had an unblemished cover of turquoise colorant and color intensity sufficient for a tinted contact lens. The lens showed excellent use as a lens for turning light colored eyes, such as green, to light turquoise.

EXAMPLE IV

The procedure of Example III was repeated, except the lenses were placed in the fixing solution at 23° C. for 2.5 hours.

The finished lens had an unblemished, yet slightly more intense cover turquoise colorant. The lens showed excellent use as a lens for turning light colored eyes, such as green, to a vibrant turquoise.

EXAMPLE V

The procedures of Example I were repeated, except the lenses were placed in the fixing solution at 23° C. for one hour and the colorant formulation was as follows:
1) 8.0 g of PVP K-30 30% aqueous solution,
2) 5.0 g of 2-Propanol,
3) 4.0 g of deionized water,
4) 0.040 g of Surfynol 420,
5) 0.035 g of Surfynol 104 PA,
6) 0.40 g of Ramazol Turquoise R-P dye (from American Huechst Corp.)
7) 1.50 g of Ramazol yellow GR dye (from American Huechst Corp.).

The finished lens had an unblemished cover of green colorant and color intensity sufficient for a tinted contact lens. The lens showed excellent use as a lens for turning light colored eyes, such as blue, to green.

The above examples illustrate that a solid, unblemished covering of colorant may be placed onto a dry hydrophilic contact lens using a silicon rubber printing pad by adding a non-ionic polyalkylene oxide surfactant to the colorant formulation. It also illustrates that a mixture of Surfynol 104 PA and Surfynol 420 is particularly useful in accordance with the present invention.

What is claimed is:

1. A method of providing a solid, substantially unblemished cover of colorant on the surface of a dry hydrophilic contact lens comprising the steps of:
(a) placing a colorant solution comprising a coloring agent, a surfactant selected from the group consisting of polyalkylene oxide-modified methylpolysiloxanes; 2,4,7,9-tetramethyl-5-decyn-4,7-diol; ethylene oxide adducts of 2,4,7,9-tetramethyl-5-decyn-4,7-diol and mixtures thereof, and water onto a silicon rubber printing pad;
(b) contacting the printing pad with a surface of the contact lens to transfer the colorant solution to the lens; and
(c) affixing the colorant to the lens;

wherein said surfactant is present in an amount sufficient to produce a substantially solid, unblemished cover of colorant on said contact lens.

2. The method of claim 1, wherein the surfactant is a low molecular weight ethylene oxide polymer.

3. The method of claim 1, wherein the surfactant is a polyalkylene oxide-modified methylpolysiloxane.

4. The method of claim 1, wherein the surfactant is a nonionic polyalkyleneoxide methoxy-terminated polydimethylsiloxane.

5. The method of claim 1, wherein the surfactant comprises 2,4,7,9-tetramethyl-5-decyn-4,7-diol in isopropyl alcohol.

6. The method of claim 1, wherein the surfactant comprises an ethylene oxide adduct of 2,4,7,9-tetramethyl-5-decyn-4,7-diol.

7. The method of claim 6, wherein the ethylene oxide adduct of 2,4,7,9-tetramethyl-5-decyn-4,7-diol has approximately 20% by weight ethylene oxide.

8. The method of claim 1, wherein the surfactant comprises a mixture of 2,4,7,9-tetramethyl-5-decyn-4,7-diol and an ethylene oxide adduct of 2,4,7,9-tetramethyl-5-decyn-4,7-diol in isopropyl alcohol.

9. The method of claim 8, wherein the 2,4,7,9-tetramethyl-5-decyn-4,7-diol and the ethylene oxide adduct of 2,4,7,9-tetramethyl-5-decyn-4,7-diol in isopropyl alcohol are present in a ratio of 1:1 by weight.

10. The method of claim 1, wherein the colorant is fixed to the lens by placing the lens having colorant into a fixing solution comprising sodium phosphate tribasic dodecohydrate, tetrabutylammonium bromide, and deionized water.

11. The method of claim 1, wherein the colorant solution comprises about 0.01 to 2.0 wt % of the surfactant and about 0.5 to 15.0 wt % of the coloring agent, and water.

12. The method of claim 11, wherein the colorant solution further comprises about 5.0 to 30.0 wt % polyvinyl pyrolidone and about 10 to 40 wt % isopropyl alcohol.

13. The method of claim 1, wherein the coloring agent is a reactive dye.

14. The method of claim 1, wherein the coloring agent is a clear ultraviolet light blocking agent.

15. A contact lens produced according to the method of claim 1.

16. The contact lens of claim 15, wherein the lens is clear and has a cover of ultraviolet light blocking agent.

17. The contact lens of claim 15, wherein the lens is tinted and capable of changing the eye color of the wearer.

18. The contact lens of claim 15, wherein the lens is tinted to enhance visibility of the lens but is not so intensely tinted as to change the eye color of the wearer.

* * * * *